US009338444B2

(12) United States Patent
Miyake

(10) Patent No.: US 9,338,444 B2
(45) Date of Patent: May 10, 2016

(54) DISPLAY DEVICE

(71) Applicant: Semiconductor Energy Laboratory Co., Ltd., Atsugi-shi, Kanagawa-ken (JP)

(72) Inventor: Hiroyuki Miyake, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/612,615

(22) Filed: Feb. 3, 2015

(65) Prior Publication Data

US 2015/0145974 A1 May 28, 2015

Related U.S. Application Data

(62) Division of application No. 13/529,137, filed on Jun. 21, 2012, now Pat. No. 8,988,411.

(30) Foreign Application Priority Data

Jul. 8, 2011 (JP) ................... 2011-151512

(51) Int. Cl.
*G09G 5/00* (2006.01)
*H04N 13/04* (2006.01)
*G09G 3/00* (2006.01)
*G09G 3/32* (2016.01)

(52) U.S. Cl.
CPC ........... *H04N 13/0409* (2013.01); *G09G 3/003* (2013.01); *G09G 3/3208* (2013.01); *H04N 13/0413* (2013.01); *H04N 13/0422* (2013.01); *H04N 13/0452* (2013.01); *G09G 2320/0209* (2013.01); *G09G 2320/10* (2013.01)

(58) Field of Classification Search
CPC ................... G09G 3/36–3/3696; G09G 3/003; H04N 13/0413; H04N 13/0409; H04N 13/0411; H04N 13/0289; H04N 13/0434; H04N 13/0452; H04N 2013/0465; G03B 35/24; G02B 27/2214
USPC ........... 345/204, 212, 108, 109; 359/227, 237
See application file for complete search history.

(56) References Cited

U.S. PATENT DOCUMENTS 5,930,037 A    7/1999   Imai
6,597,348 B1   7/2003   Yamazaki et al.

(Continued)

FOREIGN PATENT DOCUMENTS

EP        1793623 A    6/2007
JP        03-119889 A   5/1991

(Continued)

*Primary Examiner* — Stephen Sherman
(74) *Attorney, Agent, or Firm* — Robinson Intellectual Property Law Office; Eric J. Robinson

(57) ABSTRACT

The occurrence of crosstalk in a display device which performs 3D display is suppressed. When 3D display is performed, part of a plurality of pixels perform desired color display and the other part of the plurality of pixels perform black display. Thus, as compared to the case where all of a plurality of pixels perform desired color display, the occurrence of crosstalk can be suppressed. A plurality of pixels which perform desired color display are changed depending on the display state. Therefore, as compared to the case where a plurality of pixels which perform desired color display are fixed when 3D display is performed, the display device can have a longer period until display change in a pixel becomes obvious (a longer lifetime) and variations in display among the plurality of pixels can be reduced.

12 Claims, 12 Drawing Sheets

(56) References Cited

U.S. PATENT DOCUMENTS

| | | |
|---|---|---|
| 6,882,012 B2 | 4/2005 | Yamazaki et al. |
| 6,970,290 B1 | 11/2005 | Mashitani et al. |
| 7,145,536 B1 | 12/2006 | Yamazaki et al. |
| 7,193,593 B2 | 3/2007 | Koyama et al. |
| 7,224,339 B2 | 5/2007 | Koyama et al. |
| 7,268,756 B2 | 9/2007 | Koyama et al. |
| 7,317,438 B2 | 1/2008 | Yamazaki et al. |
| 7,385,579 B2 | 6/2008 | Satake |
| 7,425,937 B2 | 9/2008 | Inukai |
| 7,489,311 B2 | 2/2009 | Lee |
| 7,791,571 B2 | 9/2010 | Ohtani et al. |
| 8,174,564 B2 | 5/2012 | Kim et al. |
| 2005/0001787 A1 | 1/2005 | Montgomery et al. |
| 2005/0012097 A1 | 1/2005 | Yamazaki |
| 2006/0126177 A1 | 6/2006 | Kim et al. |
| 2007/0279359 A1 | 12/2007 | Yoshida et al. |
| 2007/0279374 A1 | 12/2007 | Kimura et al. |
| 2009/0321737 A1 | 12/2009 | Isa et al. |
| 2010/0097449 A1 | 4/2010 | Jeong et al. |
| 2010/0148177 A1 | 6/2010 | Koyama et al. |
| 2010/0182282 A1 | 7/2010 | Kurokawa et al. |
| 2011/0006979 A1 | 1/2011 | Min et al. |
| 2011/0051239 A1 | 3/2011 | Daiku |
| 2011/0157696 A1 | 6/2011 | Bennett et al. |
| 2012/0154696 A1 | 6/2012 | Koyama |
| 2012/0206325 A1 | 8/2012 | Yamazaki et al. |
| 2012/0206446 A1 | 8/2012 | Yamazaki et al. |
| 2012/0206503 A1 | 8/2012 | Hirakata et al. |
| 2012/0218325 A1 | 8/2012 | Hiroki et al. |

FOREIGN PATENT DOCUMENTS

| | | |
|---|---|---|
| JP | 08-036145 A | 2/1996 |
| JP | 09-101482 A | 4/1997 |
| JP | 09-297284 A | 11/1997 |
| JP | 2003-259395 A | 9/2003 |
| JP | 2005-092103 A | 4/2005 |
| JP | 2005-164916 A | 6/2005 |
| JP | 2005-258013 A | 9/2005 |
| JP | 2007-156413 A | 6/2007 |

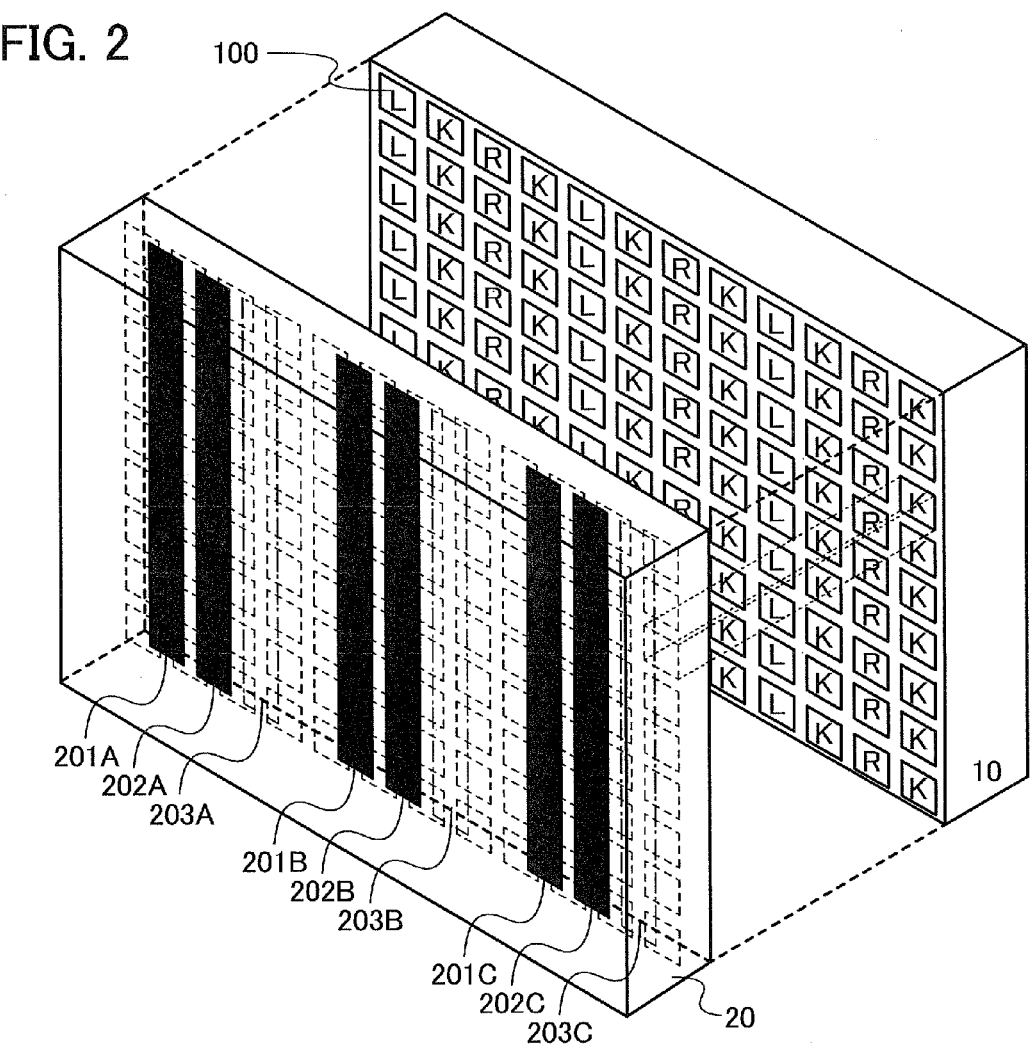

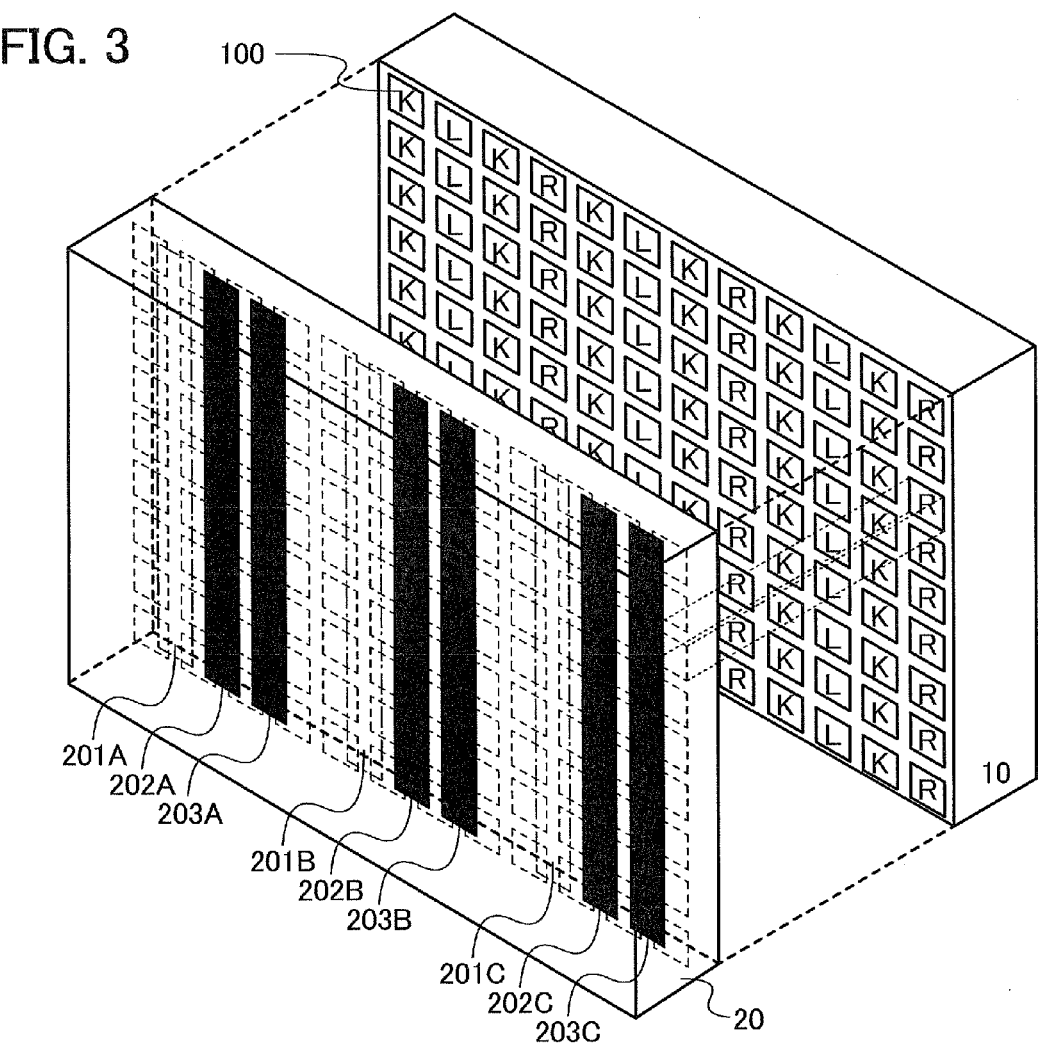

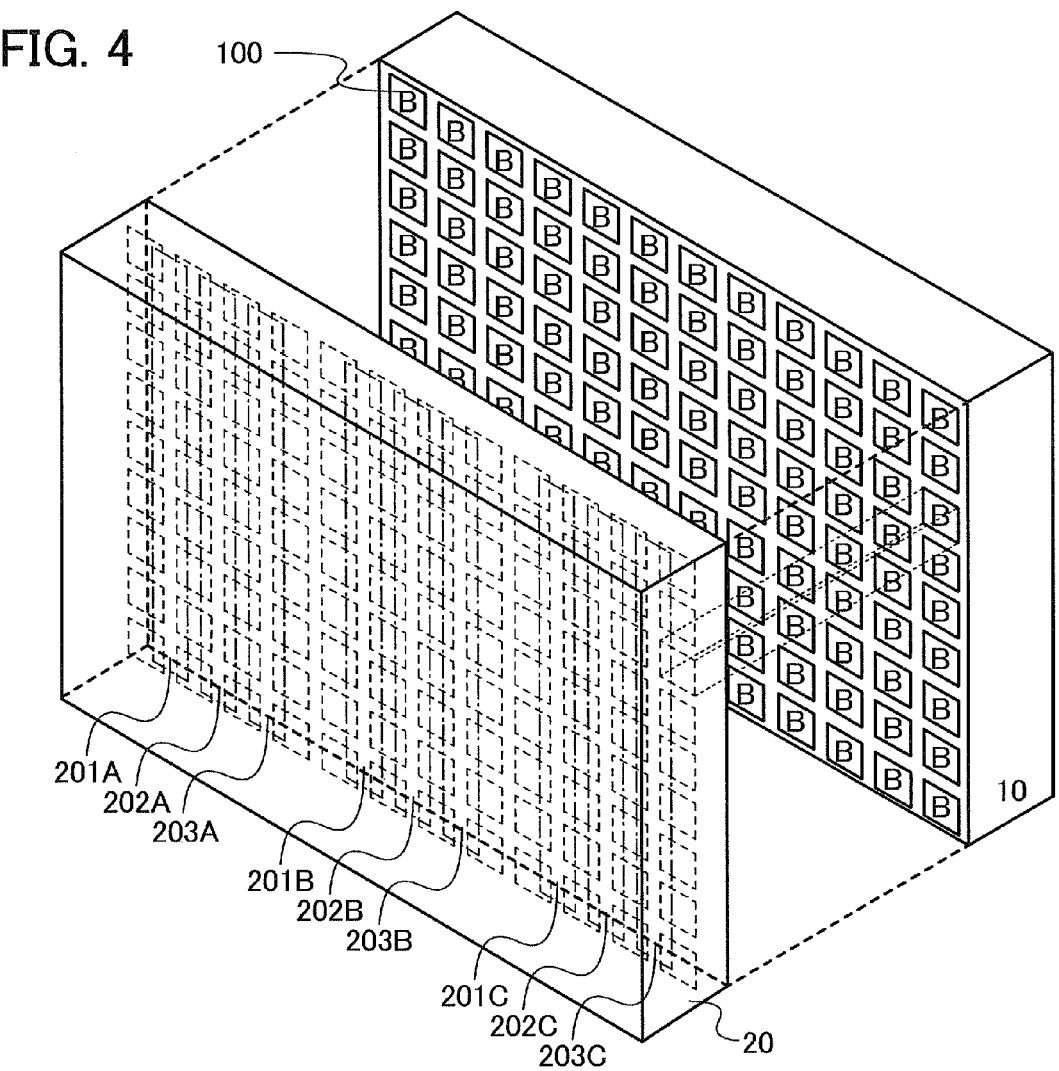

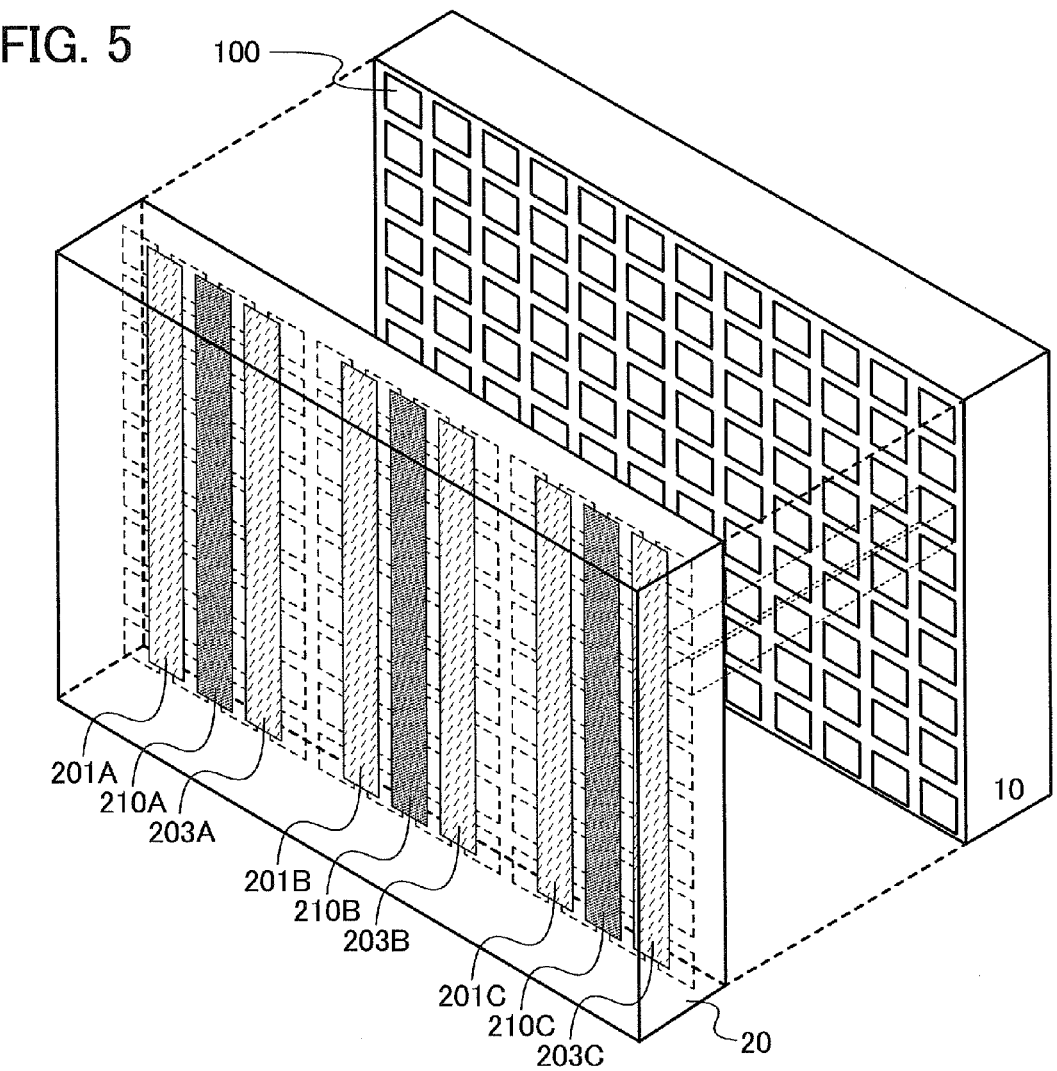

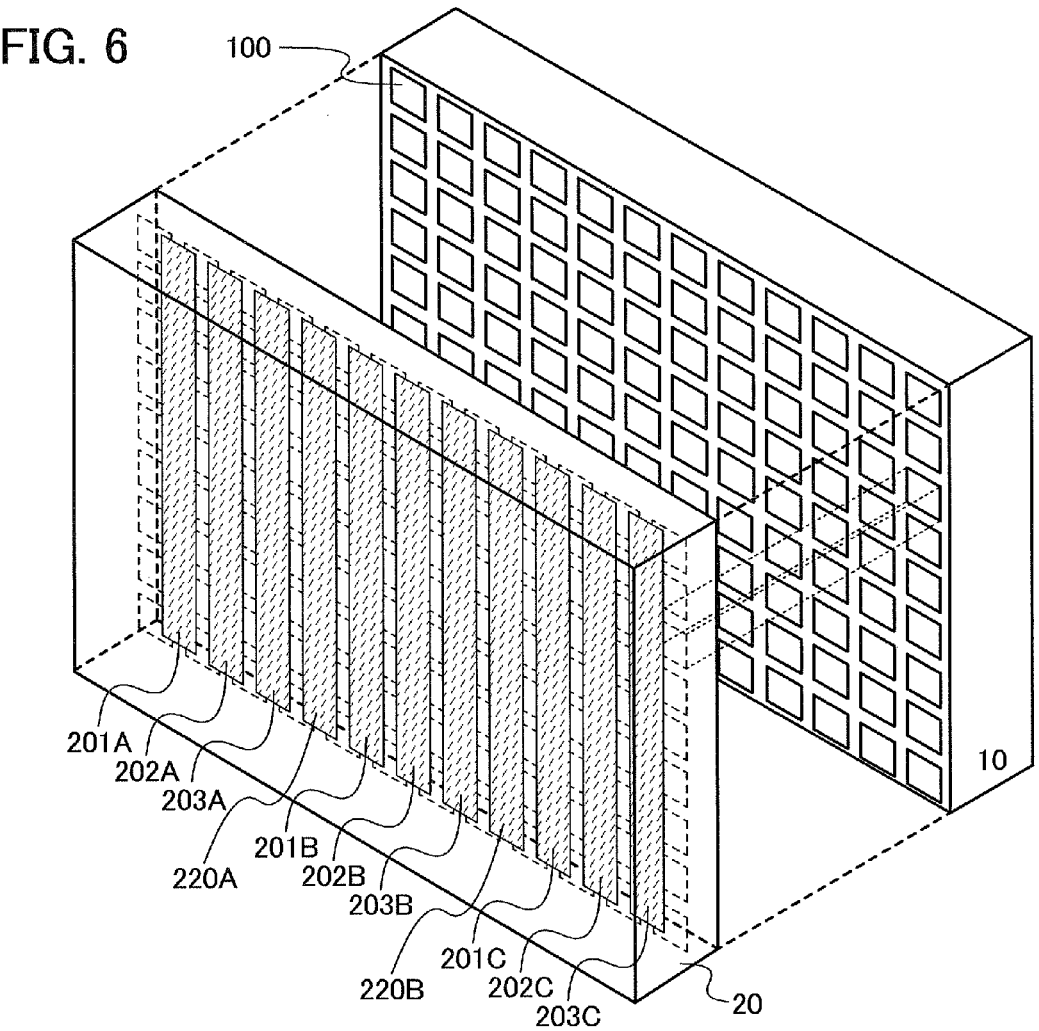

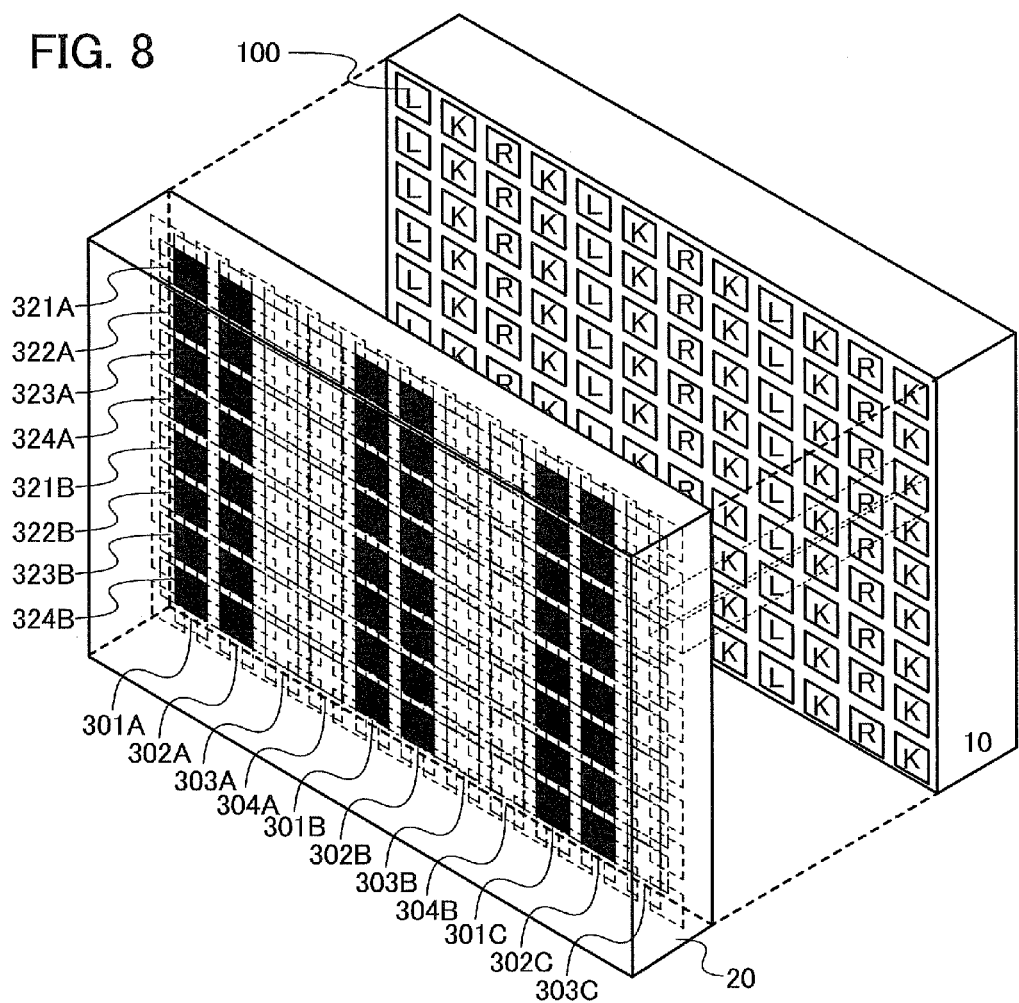

DISPLAY DEVICE

BACKGROUND OF THE INVENTION

1. Field of the Invention

The present invention relates to a display device. In particular, the present invention relates to a display device capable of performing 3D display.

2. Description of the Related Art

Display devices are widely used, ranging from large display devices such as television devices to small display devices such as mobile phones. The display devices each include a display portion in which a plurality of pixels are provided in matrix. Desired color display is performed in each pixel, so that an image is formed in the display portion. In recent years, display devices capable of performing 3D display have been developed.

As systems for performing 3D display, there are a system (a glasses system) in which a period of display for a left eye and a period of display for a right eye are distinguished from each other in a display portion and a user wears glasses so that the left eye sees the former display and the right eye sees the latter display, and a system (hereinafter, an autostereoscopic system) in which a pixel for display for a left eye and a pixel for display for a right eye are distinguished from each other in a display portion and a structure (e.g., a parallax barrier) which allows the left eye to see the former display and the right eye to see the latter display is employed.

It is not necessary to prepare glasses to see autostereoscopic 3D images, which offers a high convenience. However, in the case where a display device performing 3D display by an autostereoscopic system performs 2D display, the resolution is decreased due to a unique structure (e.g., a parallax barrier) of an autostereoscopic system.

In Patent Document 1, a display device is disclosed in which a decrease in 2D display resolution of the display device which performs 3D display by an autostereoscopic system can be prevented. Specifically, in the display device disclosed in Patent Document 1, a parallax barrier is formed using liquid crystal whose alignment state is controlled by an applied voltage. Thus, in the display device, whether a parallax barrier is provided or not can be selected. In other words, the display device can perform 3D display in a state where a parallax barrier is provided and perform 2D display in a state where a parallax barrier is not provided.

REFERENCE

[Patent Document 1] Japanese Published Patent Application No. 2005-258013

In the case where 3D display is performed using a parallax barrier, crosstalk tends to be obvious. Here, crosstalk means that a pixel which performs display for a left eye is seen by a right eye or a pixel which performs display for a right eye is seen by a left eye.

SUMMARY OF THE INVENTION

In view of the above problem, an object of one embodiment of the present invention is to suppress crosstalk in a display device which performs 3D display.

A display device according to one embodiment of the present invention includes a display panel which performs display with a plurality of pixels provided in matrix and a shutter panel in which a parallax barrier is formed by controlling a voltage applied to liquid crystal. In the display panel, part of the plurality of pixels perform desired color display and the other part of the plurality of pixels perform black display. For example, in the display panel, part of the plurality of pixels which are provided in an odd-numbered column perform desired color display and part of the plurality of pixels which are provided in an even-numbered column perform black display.

Further, in the display device according to one embodiment of the present invention, a plurality of pixels which perform desired color display are changed depending on the display state. For example, in a first display state, a plurality of pixels provided in an odd-numbered column perform desired color display, and in a second display state, a plurality of pixels provided in an even-numbered column perform desired color display. Further, the shape of a parallax barrier formed in the shutter panel is changed depending on the display state.

Specifically, a display device according to one embodiment of the present invention includes a display panel which performs display with a plurality of pixels provided in matrix and a shutter panel in which a parallax barrier is formed by controlling a voltage applied to liquid crystal in response to signals input to a plurality of first electrodes, a plurality of second electrodes, and a plurality of third electrodes which are provided in parallel or substantially parallel to one another. A common signal is input to the plurality of first electrodes. A common signal is input to the plurality of second electrodes. A common signal is input to the plurality of third electrodes. One of the plurality of second electrodes is provided between the first electrodes which are adjacent to each other, and one of the plurality of first electrodes is provided between the second electrodes which are adjacent to each other. One of the plurality of third electrodes is provided in a region which is between the first electrode and the second electrode which are adjacent to each other and in which the first electrode is provided on the first direction side and the second electrode is provided on the second direction side which is opposite to the first direction side. In a first display state in which part of the plurality of pixels perform desired color display and the other part of the plurality of pixels perform black display, a light-transmitting signal is input to the plurality of first electrodes and a light-blocking signal is input to the plurality of second electrodes and the plurality of third electrodes. In a second display state in which part of the plurality of pixels, which are different from the part of the plurality of pixels which perform desired color display in the first display state, perform desired color display and the other part of the plurality of pixels perform black display, a light-transmitting signal is input to the plurality of second electrodes and a light-blocking signal is input to the plurality of first electrodes and the plurality of third electrodes.

When a display device according to one embodiment performs 3D display, part of a plurality of pixels perform desired color display and the other part of the plurality of pixels perform black display. Thus, as compared to the case where all of a plurality of pixels perform desired color display, the occurrence of crosstalk can be suppressed.

In a display device according to one embodiment of the present invention, a plurality of pixels which perform desired color display are changed depending on the display state. Thus, as compared to the case where a plurality of pixels which perform desired color display are fixed when 3D display is performed, the display device can have a longer period until display change (display deterioration) in a pixel becomes obvious (a longer lifetime) and variations in display among the plurality of pixels can be reduced. Specifically, in the case where a plurality of pixels which perform desired color display are fixed when 3D display is performed, there is a possibility that a period during which part of the plurality of pixels perform desired color display is extremely longer than a period during which the other part of the plurality of pixels perform desired color display. In addition, only display performed by the part of the plurality of pixels may be significantly changed from the initial display. In this case, by changing the plurality of pixels which perform desired color display depending on the display state, the display device can have a longer period until display change in the pixel becomes obvious (a longer lifetime) and variations in display among the plurality of pixels can be reduced.

BRIEF DESCRIPTION OF THE DRAWINGS

In the accompanying drawings:

FIG. 2 illustrates an example of a display state;

FIG. 3 illustrates an example of a display state;

FIG. 4 illustrates an example of a display state;

FIG. 5 illustrates a structure example of a display device;

FIG. 6 illustrates a structure example of a display device;

FIG. 8 illustrates an example of a display state;

DETAILED DESCRIPTION OF THE INVENTION

Embodiments of the present invention will be described below in detail. Note that the present invention is not limited to the description below, and a variety of changes can be made without departing from the spirit and scope of the present invention. Therefore, the present invention is not construed as being limited to the description given below.

Embodiment 1

In this embodiment, a display device according to one embodiment of the present invention will be described with reference to FIGS. 1A to 1C, FIG. 2, FIG. 3, and FIG. 4.

<Structure Example of Display Device>

Figure 1A:
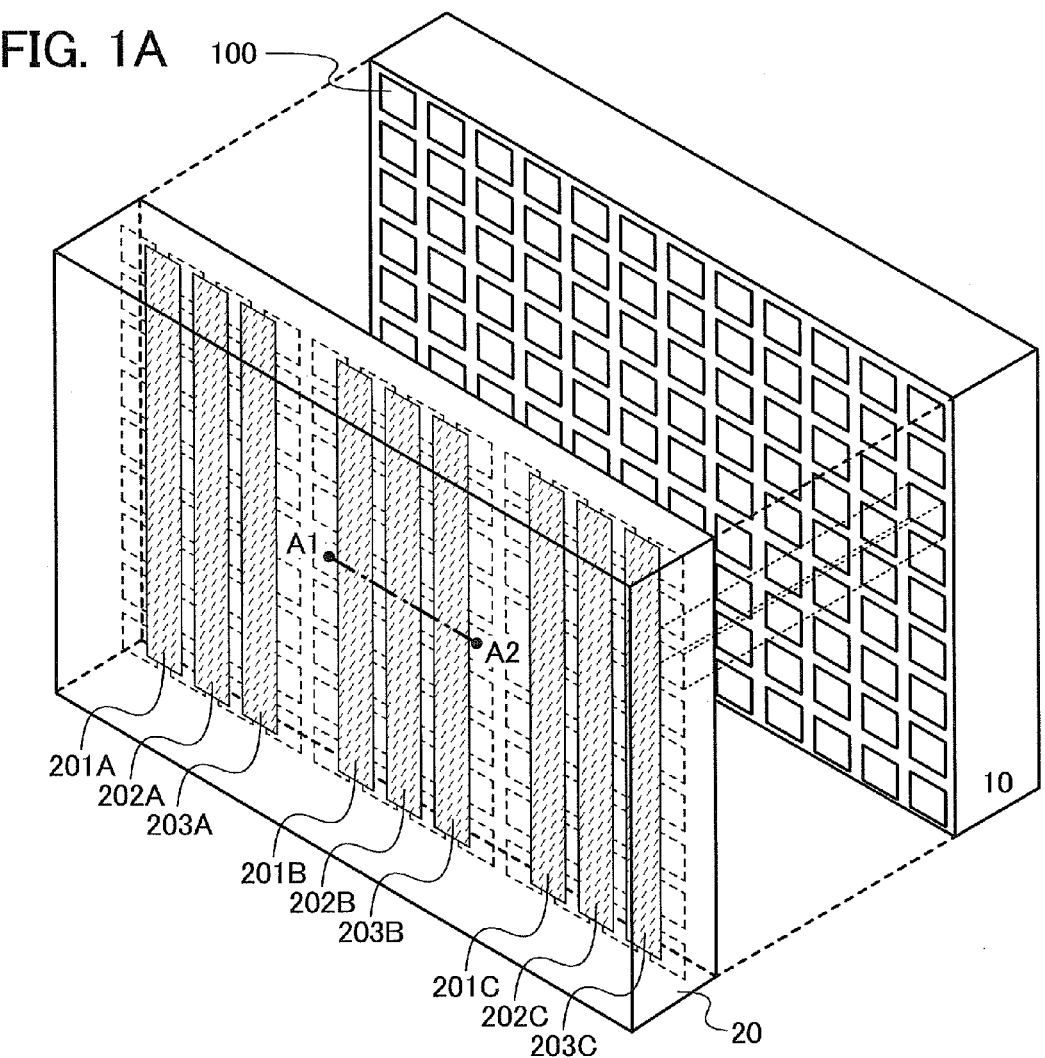
FIG. 1A illustrates a structure example of a display device.

FIG. 1A illustrates a structure example of the display device in this embodiment. The display device in FIG. 1A includes a display panel 10 and a shutter panel 20. The display panel 10 includes a plurality of pixels 100 which are provided in matrix. Display is performed using the plurality of pixels 100. The shutter panel 20 includes electrodes 201A to 201C, 202A to 202C, and 203A to 203C which are provided in parallel or substantially parallel to one another (in stripes). Note that the electrodes 201A to 201C, 202A to 202C, and 203A to 203C transmit light.

Note that in the display device in FIG. 1A, the width of each of the electrodes 201A to 201C, 202A to 202C, and 203A to 203C is the same or substantially the same as the width of the pixel 100. Further, there is a region where an electrode with a width the same or substantially the same as the width of each of the electrodes 201A to 201C, 202A to 202C, and 203A to 203C can be provided, between the electrode 203A and the electrode 201B and between the electrode 203B and the electrode 201C.

As the display panel 10 in FIG. 1A, a display panel (hereinafter, also referred to as an organic EL panel) which performs desired color display using organic electroluminescence in each of the plurality of pixels 100, a display panel which performs desired color display by controlling the alignment state of liquid crystal in each of the plurality of pixels 100, or the like can be used. In particular, the display device in this embodiment can have a longer period until display change in the pixel 100 becomes obvious (a longer lifetime). Therefore, when an organic EL panel in which display change in a pixel tends to be obvious relatively easily is used as the display panel 10, a great effect can be obtained.

Figure 1B:
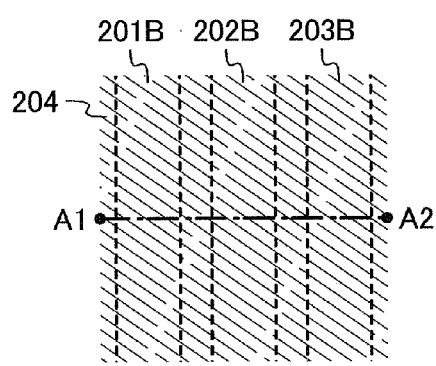
FIG. 1B is a plan view illustrating a structure example of a shutter panel.
Figure 1C:
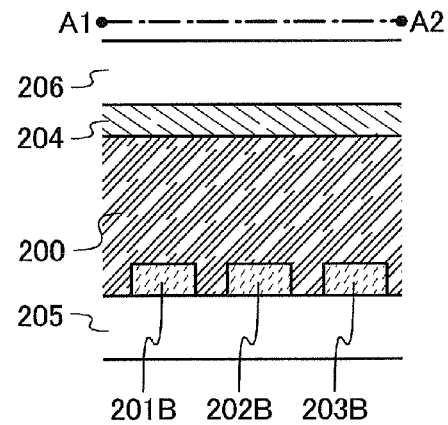
FIG. 1C is a cross-sectional view illustrating the structure example of the shutter panel.

FIGS. 1B and 1C are a plan view and a cross-sectional view, respectively, of the vicinity of A1-A2 in the shutter panel 20 in FIG. 1A. The shutter panel 20 in FIGS. 1B and 1C includes a substrate 205 and a substrate 206 which are provided to face each other, the electrodes 201B to 203B provided over one surface of the substrate 205 facing the substrate 206, an electrode 204 provided over one surface of the substrate 206 facing the substrate 205, and liquid crystal 200 provided between the electrode 204 and the electrodes 201B to 203B. Note that the substrates 205 and 206 and the electrode 204 transmit light.

In the shutter panel 20 in FIGS. 1A to 1C, voltages applied to the liquid crystal in response to signals input to the electrodes 201A to 201C, 202A to 202C, and 203A to 203C are controlled, so that a parallax barrier is formed. Specifically, the alignment of the liquid crystal between the electrode 204 and the electrodes 201A to 201C, 202A to 202C, and 203A to 203C is controlled in response to signals input to the electrodes 201A to 201C, 202A to 202C, and 203A to 203C.

Note that the shutter panel 20 is a panel in which as a voltage applied to liquid crystal is lower, light-transmittance is higher (hereinafter also referred to as a normally white panel). As the signals, there are light-blocking signals and light-transmitting signals. With the light-blocking signals, regions which are the same or substantially the same as the regions where the electrodes 201A to 201C, 202A to 202C, and 203A to 203C are provided can be brought into a light-blocking state, and with the light-transmitting signals, the regions can be brought into a light-transmitting state.

Further, a common signal is input to the electrodes 201A to 201C. A common signal is input to the electrodes 202A to 202C. A common signal is input to the electrodes 203A to 203C.

<Example of Display State>

FIG. 2, FIG. 3, and FIG. 4 illustrate examples of display states of the display device in FIGS. 1A to 1C. Note that FIG. 2 and FIG. 3 each illustrate an example of a display state of the display device when a 3D image is displayed, and FIG. 4 illustrates an example of a display state of the display device when a 2D image is displayed.

In the display state in FIG. 2, part of the plurality of pixels 100 perform display for a left eye (denoted by "L" in the drawing) or display for a right eye (denoted by "R" in the drawing), and the other part of the plurality of pixels 100 perform black display (denoted by "K" in the drawing). Specifically, a plurality of pixels 100 which are provided in a particular column perform display for a left eye or a right eye and a plurality of pixels 100 which are provided in a column adjacent to the particular column perform black display. In addition, a plurality of pixels 100 which are provided in a column adjacent to the particular column with the column of black display sandwiched therebetween, perform display for an eye opposite to a left eye or a right eye for which display is performed in the plurality of pixels 100 which are provided in the particular column (in the case where the plurality of pixels 100 which are provided in the particular column perform display for a left (right) eye, the plurality of pixels 100 which are provided in the column adjacent to the particular column with the column of black display sandwiched therebetween perform display for a right (left) eye.).

Further, in the display state in FIG. 2, a light-blocking signal is input to the electrodes 201A to 201C and 202A to 202C, and a light-transmitting signal is input to the electrodes 203A to 203C. Thus, in the shutter panel 20, the regions which are the same or substantially the same as the regions where the electrodes 201A to 201C and 202A to 202C are provided are brought into a light-blocking state (black portions in the drawing) and the regions where the electrodes 203A to 203C are provided are brought into a light-transmitting state (portions denoted by dashed-dotted lines in the drawing).

In the display state in FIG. 2, a light-blocking region formed when a light-blocking signal is input to the electrodes 201A to 201C can prevent a right eye of a user from seeing the pixels 100 which perform display for a left eye, and a light-blocking region formed when a light-blocking signal is input to the electrodes 202A to 202C can prevent the left eye of the user from seeing the pixels 100 which perform display for the right eye. Further, in the display state in FIG. 2, there are the pixels 100 which perform black display between the pixels 100 which perform display for a left eye and the pixels 100 which perform display for a right eye. Thus, the occurrence of crosstalk in the case where the location of user's eyepoint is changed can be suppressed.

In the display state in FIG. 3, the pixels 100 which perform black display in the display state in FIG. 2 perform display for a left eye or a right eye, and the pixels 100 which perform display for a left eye or a right eye in the display state in FIG. 2 perform black display. Note that the relative positional relation of the pixels 100 which perform display for a left eye, the pixels 100 which perform display for a right eye, and the pixels 100 which perform black display is similar to the positional relation thereof in FIG. 2; therefore, the above description is referred to here.

Further, in the display state in FIG. 3, a light-blocking signal is input to the electrodes 202A to 202C and 203A to 203C, and a light-transmitting signal is input to the electrodes 201A to 201C. Thus, in the shutter panel 20, regions which are the same or substantially the same as the regions where the electrodes 202A to 202C and 203A to 203C are provided are brought into a light-blocking state, and the regions where the electrodes 201A to 201C are provided are brought into a light-transmitting state.

In the display state in FIG. 3, a light-blocking region formed when a light-blocking signal is input to the electrodes 202A to 202C can prevent a right eye of a user from seeing the pixels 100 which perform display for a left eye, and a light-blocking region formed when a light-blocking signal is input to the electrodes 203A to 203C can prevent the left eye of the user from seeing the pixels 100 which perform display for the right eye. Similarly to the above, the occurrence of crosstalk can be suppressed.

In the display device in this embodiment, 3D display is performed in the display state in FIG. 2 or FIG. 3, which can lead to suppression of the occurrence of crosstalk. When both of the display states in FIG. 2 and FIG. 3 are used, a period during which part of the plurality of pixels perform desired color display can be the same or substantially the same as a period during which the other part of the plurality of pixels perform desired color display. Thus, even when display is changed depending on the period during which the pixels 100 perform desired color display, the display device can have a longer period until display change in the pixel 100 becomes obvious (a longer lifetime) by changing the pixels 100 which perform desired color display as appropriate. In addition, variations in display among the plurality of pixels in such a case can be reduced.

In the display state in FIG. 4, all of the plurality of pixels 100 perform display for both eyes (denoted by "B" in the drawing). Further, in the display state in FIG. 4, a light-transmitting signal is input to all of the electrodes 201A to 201C, 202A to 202C, and 203A to 203C. Thus, in the shutter panel 20, all of the regions where the electrodes 201A to 201C, 202A to 202C, and 203A to 203C are provided are brought into a light-transmitting state.

In the display state in FIG. 4, a parallax barrier is not formed. Therefore, in the display device in this embodiment, 2D display can be performed without a decrease in resolution.

<Modification Example>

The above display device is one embodiment of the present invention; the present invention also includes a display device that is different from the above display device.

For example, the electrodes 202A to 202C in FIG. 1A can be replaced with light-blocking layers 210A to 210C (see FIG. 5). Note that the light-blocking layers 210A to 210C do not mean layers which select a light-transmitting state or a light-blocking state depending on an input signal but mean layers always having a light-blocking property. The display device in FIG. 5 can be brought into the display state in FIG. 2 and the display state in FIG. 3. Thus, in the display device in FIG. 5, the occurrence of crosstalk can be suppressed and variations in display among the plurality of pixels can be reduced. The display device in FIG. 5 can have a longer period until display change in the pixel 100 becomes obvious (a longer lifetime).

The shutter panel 20 in FIG. 1A can have a structure in which an electrode 220A is provided between the electrode 203A and the electrode 201B and an electrode 220B is provided between the electrode 203B and the electrode 201C (see FIG. 6). Note that the electrodes 220A and 220B transmit light. The display device in FIG. 6 can be brought into the display state in FIG. 2 and the display state in FIG. 3. In the display device, for the shutter panel 20, a normally white panel or a panel in which as a voltage applied to liquid crystal is increased, light transmittance becomes higher (hereinafter also referred to as a normally black panel) can be used.

Embodiment 2

In this embodiment, a display device according to one embodiment of the present invention, which is different from Embodiment 1, will be described with reference to FIGS. 7A to 7C, FIG. 8, FIG. 9, FIG. 10, and FIG. 11.

<Structure Example of Display Device>

Figure 7A:
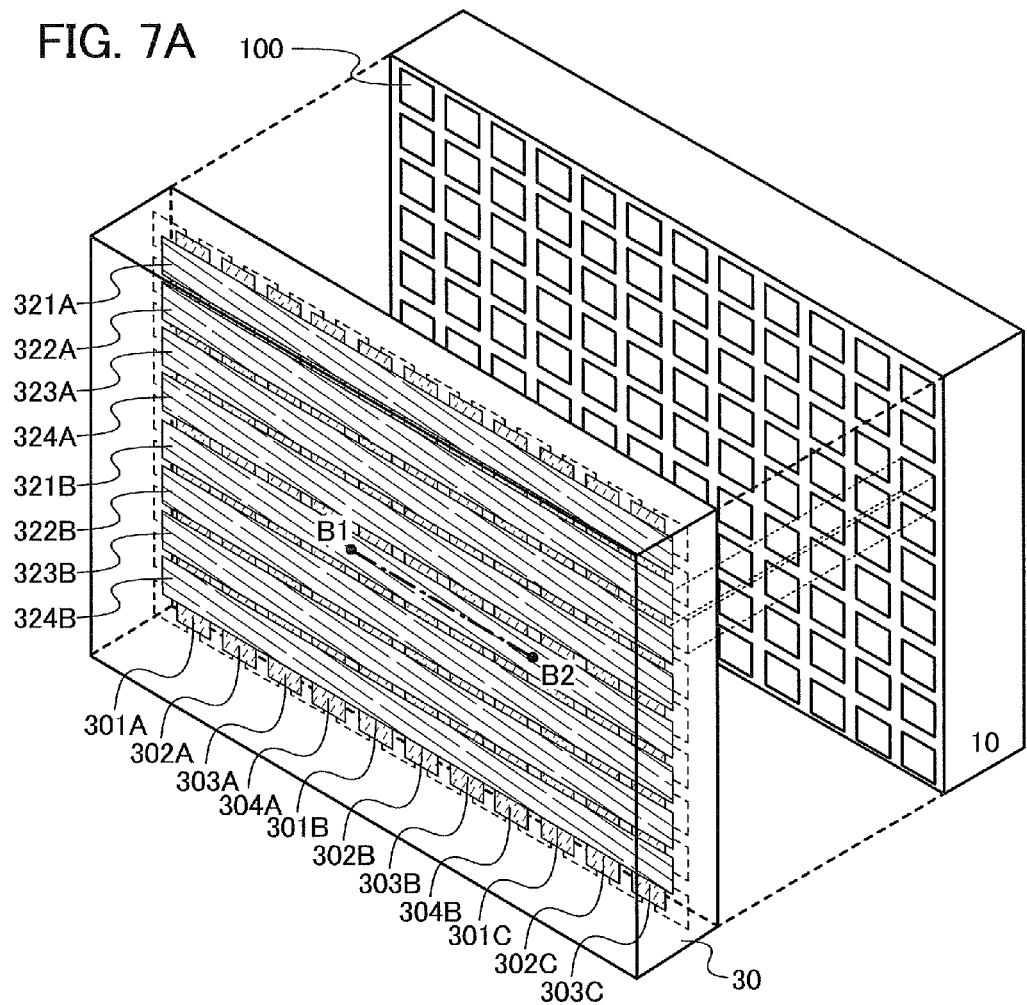
FIG. 7A illustrates a structure example of a display device.

FIG. 7A illustrates a structure example of the display device in this embodiment. The display device in FIG. 7A includes a display panel 10 and a shutter panel 30. Further, the shutter panel 30 includes electrodes 301A to 301C, 302A to 302C, 303A to 303C, 304A, and 304B which are provided in parallel or substantially parallel to one another, and electrodes 321A, 321B, 322A, 322B, 323A, 323B, 324A, and 324B which are provided in parallel or substantially parallel to one another. Note that the electrodes 301A to 301C, 302A to 302C, 303A to 303C, 304A, and 304B are perpendicular or substantially perpendicular to the electrodes 321A, 321B, 322A, 322B, 323A, 323B, 324A, and 324B. In addition, the electrodes 301A to 301C, 302A to 302C, 303A to 303C, 304A, 304B, 321A, 321B, 322A, 322B, 323A, 323B, 324A, and 324B transmit light. A panel similar to the display panel 10 in FIG. 1A can be used as the display panel 10 in FIG. 7A.

Figure 7B:
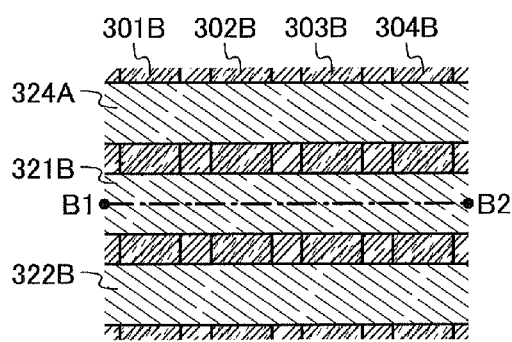
FIG. 7B is a plan view illustrating a structure example of a shutter panel.
Figure 7C:
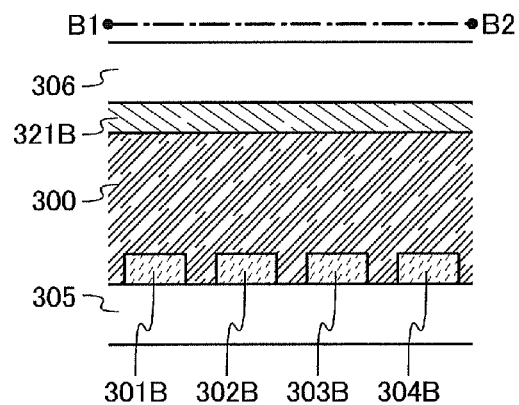
FIG. 7C is a cross-sectional view illustrating the structure example of the shutter panel.

FIGS. 7B and 7C are a plan view and a cross-sectional view, respectively, of the vicinity of B1-B2 in the shutter panel 30 in FIG. 7A. The shutter panel 30 in FIGS. 7B and 7C includes a substrate 305 and a substrate 306 which are provided to face each other, the electrodes 301B to 304B provided over one surface of the substrate 305 facing the substrate 306, the electrodes 324A, 321B, and 322B provided over one surface of the substrate 306 facing the substrate 305, and liquid crystal 300 provided between the electrodes 301B to 304B and the electrodes 324A, 321B, and 322B. Note that the substrates 305 and 306 transmit light.

In the shutter panel 30 in FIGS. 7A to 7C, voltages applied to the liquid crystal in response to signals input to the electrodes 301A to 301C, 302A to 302C, 303A to 303C, 304A, 304B, 321A, 321B, 322A, 322B, 323A, 323B, 324A, and 324B are controlled, so that a parallax barrier is formed. Specifically, the alignment of the liquid crystal between the electrodes 301A to 301C, 302A to 302C, 303A to 303C, 304A, and 304B and the electrodes 321A, 321B, 322A, 322B, 323A, 323B, 324A, and 324B is controlled in response to signals input to the electrodes 301A to 301C, 302A to 302C, 303A to 303C, 304A, 304B, 321A, 321B, 322A, 322B, 323A, 323B, 324A, and 324B.

As the shutter panel 30, a normally white panel or a normally black panel can be used. Here, a normally white panel is used. As the signals, there are light-blocking signals and light-transmitting signals. In the case where a light-blocking signal is input to one of the electrodes 301A to 301C, 302A to 302C, 303A to 303C, 304A, and 304B, and a light-blocking signal is input to one of the electrodes 321A, 321B, 322A, 322B, 323A, 323B, 324A, and 324B, a region where the former electrode and the latter electrode are overlapped with each other is brought into a light-blocking state. In the case where a light-transmitting signal is input to at least one of the former electrode and the latter electrode, the region where the former electrode and the latter electrode are overlapped with each other is brought into a light-transmitting state.

Further, a common signal is input to the electrodes 301A to 301C. A common signal is input to the electrodes 302A to 302C. A common signal is input to the electrodes 303A to 303C. A common signal is input to the electrodes 304A and 304B. A common signal is input to the electrodes 321A and 321B. A common signal is input to the electrodes 322A and 322B. A common signal is input to the electrodes 323A and 323B. A common signal is input to the electrodes 324A and 324B.

<Example of Display State>

Figure 9:
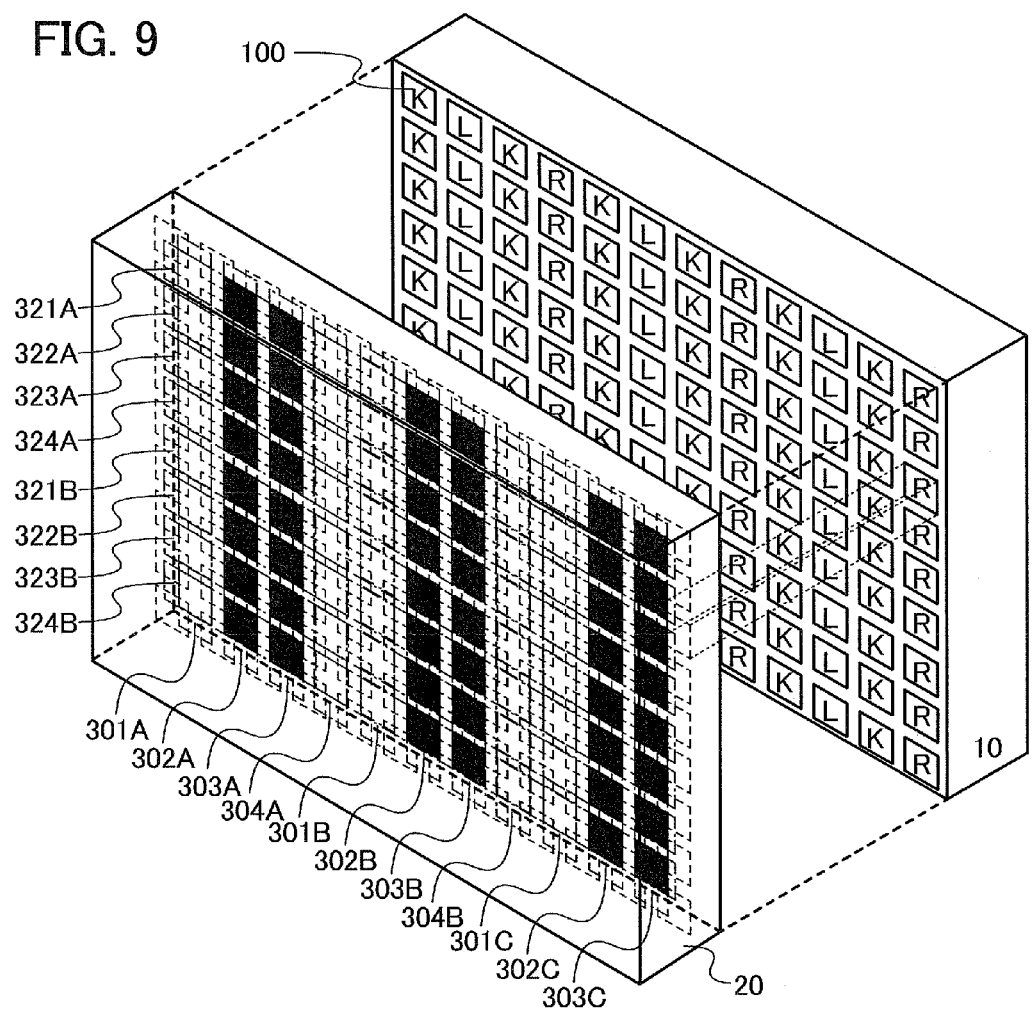
FIG. 9 illustrates an example of a display state.
Figure 10:
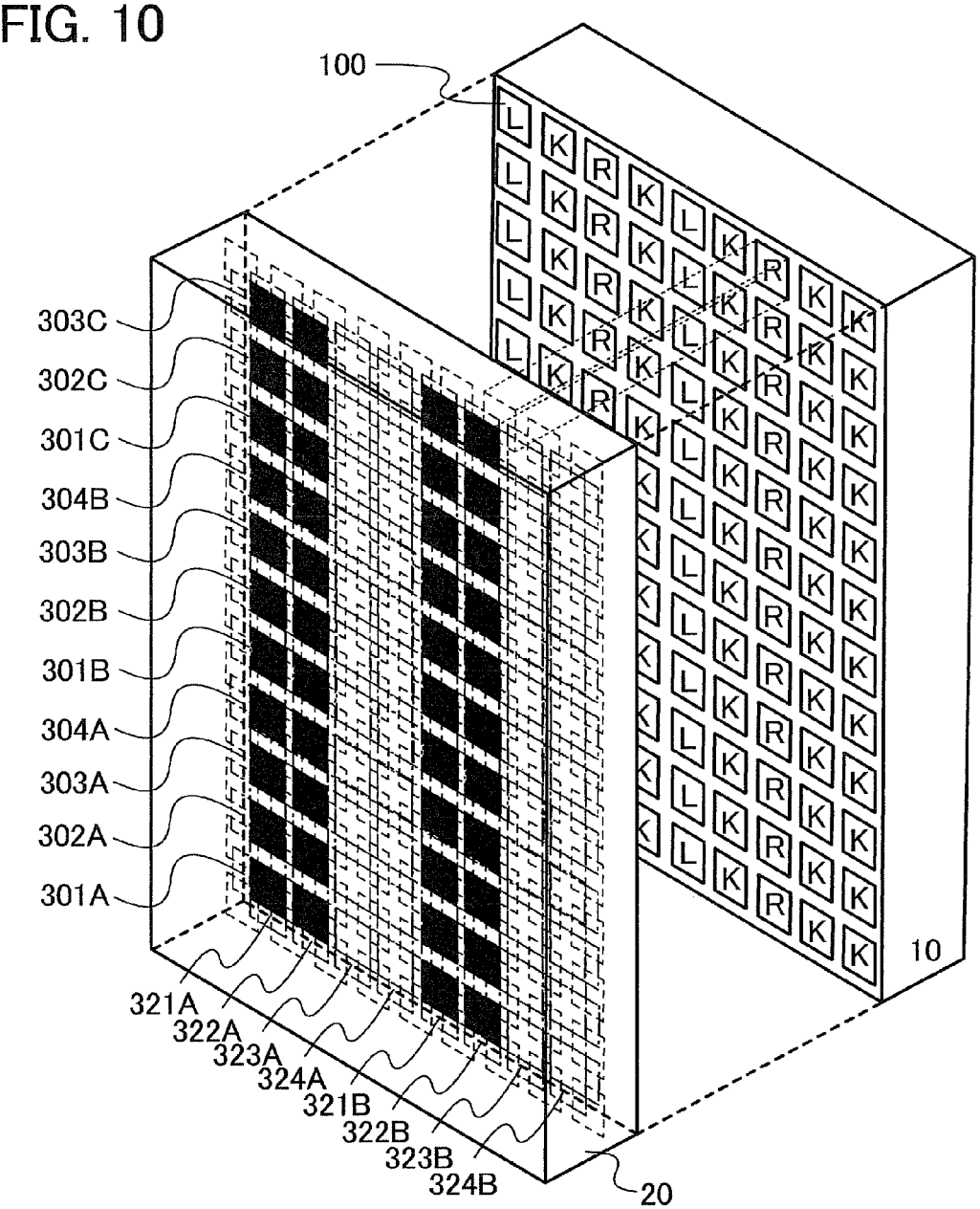
FIG. 10 illustrates an example of a display state.
Figure 11:
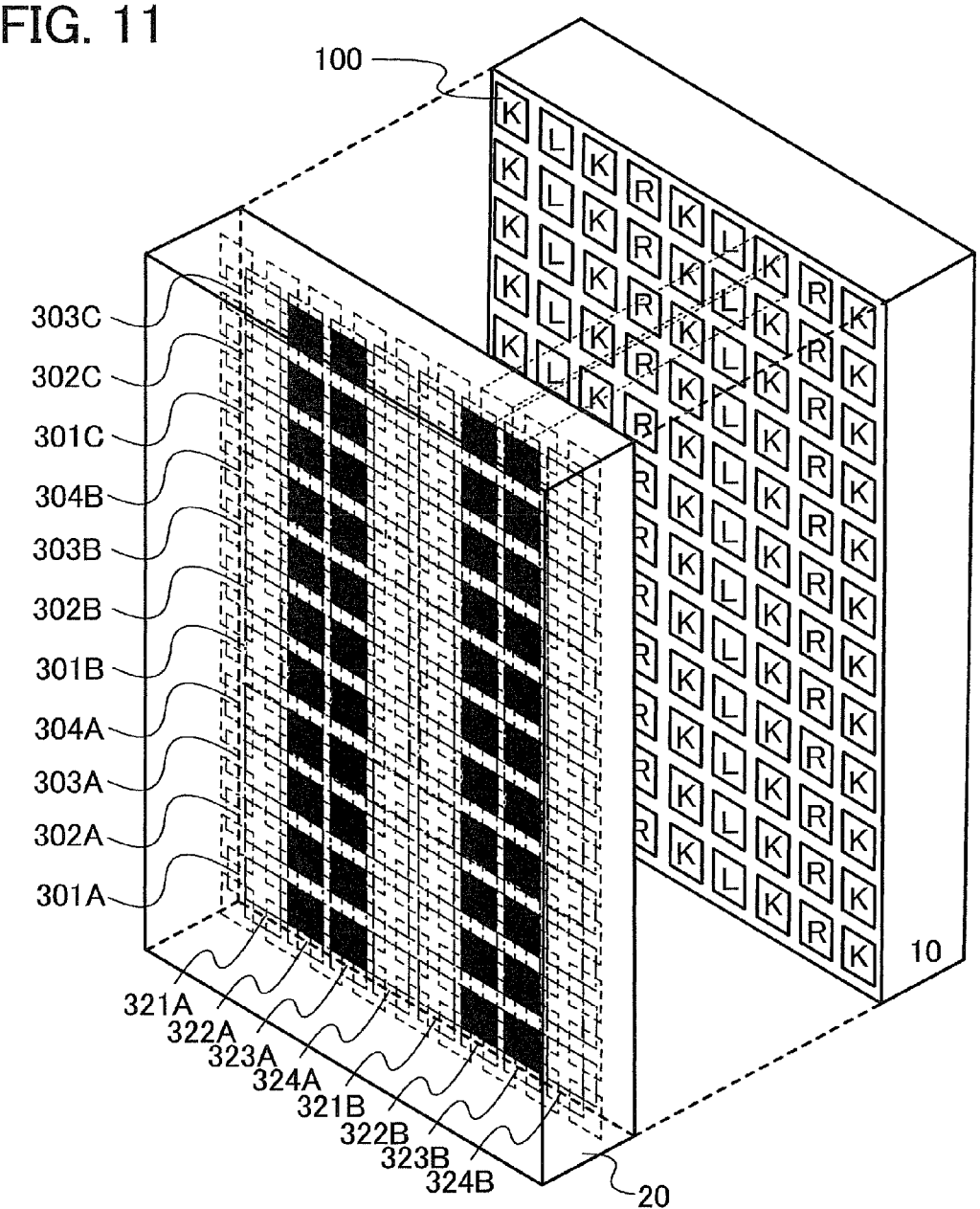
FIG. 11 illustrates an example of a display state.

FIG. 8, FIG. 9, FIG. 10, and FIG. 11 illustrate examples of display states of the display device in FIG. 7 in the case where 3D display is performed. Note that FIG. 8 and FIG. 9 and FIG. 10 and FIG. 11 are different in direction in which a user uses the display device. In other words, FIG. 8 and FIG. 9 show examples of the case where binocular parallax exists in the long-side direction of the display device with a rectangular parallelepiped shape, and FIG. 10 and FIG. 11 show examples of the case where binocular parallax exists in the short-side direction of the display device with a rectangular parallelepiped shape.

The display state in FIG. 8 is similar to the display state of the display panel 10 in FIG. 2. Therefore, the above description is referred to here.

Further, in the display state in FIG. 8, a light-blocking signal is input to the electrodes 301A to 301C, 302A to 302C, 321A and 321B, 322A and 322B, 323A and 323B, and 324A and 324B, and a light-transmitting signal is input to the electrodes 303A to 303C, and 304A and 304B. Thus, in the shutter panel 20, regions where each of the electrodes 301A to 301C and 302A to 302C overlaps with the electrodes 321A, 321B, 322A, 322B, 323A, 323B, 324A, and 324B are brought into a light-blocking state, and regions where each of the electrodes 303A to 303C, 304A, and 304B overlaps with the electrodes 321A, 321B, 322A, 322B, 323A, 323B, 324A, and 324B are brought into a light-transmitting state.

In the display state in FIG. 8, the regions where each of the electrodes 301A to 301C overlaps with the electrodes 321A, 321B, 322A, 322B, 323A, 323B, 324A, and 324B are brought into a light-blocking state, whereby the pixels 100 which perform display for a left eye can be prevented from being seen by a right eye of a user; the regions where each of the electrodes 302A to 302C overlaps with the electrodes 321A, 321B, 322A, 322B, 323A, 323B, 324A, and 324B are brought into a light-blocking state, whereby the pixels 100 which perform display for the right eye can be prevented from being seen by the left eye of the user. Further, in the display state in FIG. 8, there are the pixels 100 which perform black display between the pixels 100 which perform display for a left eye and the pixels 100 which perform display for a right eye. Thus, the occurrence of crosstalk in the case where the location of user's eyepoint is changed can be suppressed.

In the display state in FIG. 9, the pixels 100 which perform black display in the display state in FIG. 8 perform display for a left eye or a right eye, and the pixels 100 which perform display for a left eye or a right eye in the display state in FIG. 8 perform black display. Note that the relative positional relation of the pixels 100 which perform display for a left eye, the pixels 100 which perform display for a right eye, and the pixels 100 which perform black display is similar to the positional relation thereof in FIG. 8.

Further, in the display state in FIG. 9, a light-blocking signal is input to the electrodes 302A to 302C, 303A to 303C, 321A and 321B, 322A and 322B, 323A and 323B, and 324A and 324B, and a light-transmitting signal is input to the electrodes 301A to 301C, and 304A and 304B. Thus, in the shutter panel 20, regions where each of the electrodes 302A to 302C, and 303A to 303C overlaps with the electrodes 321A, 321B, 322A, 322B, 323A, 323B, 324A, and 324B are brought into a light-blocking state, and regions where each of the electrodes 301A to 301C, 304A, and 304B overlaps with the electrodes 321A, 321B, 322A, 322B, 323A, 323B, 324A, and 324B are brought into a light-transmitting state.

In the display state in FIG. 9, the regions where each of the electrodes 302A to 302C overlaps with the electrodes 321A, 321B, 322A, 322B, 323A, 323B, 324A, and 324B are brought into a light-blocking state, whereby the pixels 100 which perform display for a left eye can be prevented from being seen by a right eye of a user; the regions where each of the electrodes 303A to 303C overlaps with the electrodes 321A, 321B, 322A, 322B, 323A, 323B, 324A, and 324B are brought into a light-blocking state, whereby the pixels 100 which perform display for the right eye can be prevented from being seen by the left eye of the user. Further, similarly to the above, the occurrence of crosstalk can be suppressed.

In the display device in this embodiment, 3D display is performed in the display state in FIG. 8 or FIG. 9, which can lead to suppression of the occurrence of crosstalk. When both of the display states in FIG. 8 and FIG. 9 are used, a period during which part of the plurality of pixels perform desired color display can be the same or substantially the same as a period during which the other part of the plurality of pixels perform desired color display. Thus, even when display is changed depending on the period during which the pixels 100 perform desired color display, the display device can have a longer period until display change in the pixel 100 becomes obvious (a longer lifetime) by changing the pixels 100 which perform desired color display as appropriate. In addition, variations in display among the plurality of pixels in such a case can be reduced.

In the display state in FIG. 10, part of the plurality of pixels 100 perform display for a left eye or display for a right eye, and the other part of the plurality of pixels 100 perform black display. Specifically, a plurality of pixels 100 in a particular row perform display for a left eye or a right eye and a plurality of pixels 100 which are provided in a row adjacent to the particular row perform black display. In addition, a plurality of pixels 100 provided in a row adjacent to the particular row with the row of black display sandwiched therebetween, performed display for an eye opposite to a left eye or a right eye for which display is performed in the plurality of pixels 100 which are provided in the particular row (in the case where the plurality of pixels 100 which are provided in the particular row perform display for a left (right) eye, the plurality of pixels 100 in the row adjacent to the particular row with the row of black display sandwiched therebetween perform display for a right (left) eye.).

In the display state in FIG. 10, a light-blocking signal is input to the electrodes 301A to 301C, 302A to 302C, 303A to 303C, 304A and 304B, 321A and 321B, and 322A and 322B, and a light-transmitting signal is input to the electrodes 323A and 323B, and 324A and 324B. Thus, in the shutter panel 20, regions where each of the electrodes 301A to 301C, 302A to 302C, 303A to 303C, 304A, and 304B overlaps with the electrodes 321A, 321B, 322A, and 322B are brought into a light-blocking state, and regions where each of the electrodes 301A to 301C, 302A to 302C, 303A to 303C, 304A, and 304B overlaps with the electrodes 323A, 323B, 324A, and 324B are brought into a light-transmitting state.

In the display state in FIG. 10, the regions where each of the electrodes 301A to 301C, 302A to 302C, 303A to 303C, 304A, and 304B overlaps with the electrodes 321A and 321B are brought into a light-blocking state, whereby the pixels 100 which perform display for a left eye can be prevented from being seen by a right eye of a user; the regions where each of the electrodes 301A to 301C, 302A to 302C, 303A to 303C, 304A, and 304B overlaps with the electrodes 322A and 322B are brought into a light-blocking state, whereby the pixels 100 which perform display for the right eye can be prevented from being seen by the left eye of the user. Further, similarly to the above, the occurrence of crosstalk can be suppressed.

In the display state in FIG. 11, part of the pixels 100 which perform black display in the display state in FIG. 10 perform display for a left eye or a right eye, and the pixels 100 which perform display for a left eye or a right eye in the display state in FIG. 10 perform black display. Note that the relative positional relation of the pixels 100 which perform display for a left eye, the pixels 100 which perform display for a right eye, and the pixels 100 which perform black display is the same as the positional relation thereof in FIG. 10.

In the display state in FIG. 11, a light-blocking signal is input to the electrodes 301A to 301C, 302A to 302C, 303A to 303C, 304A and 304B, 322A and 322B, and 323A and 323B, and a light-transmitting signal is input to the electrodes 321A and 321B, and 324A and 324B. Thus, in the shutter panel 20, regions where each of the electrodes 301A to 301C, 302A to 302C, 303A to 303C, 304A, and 304B overlaps with the electrodes 322A, 322B, 323A, and 323B are brought into a light-blocking state, and regions where each of the electrodes 301A to 301C, 302A to 302C, 303A to 303C, 304A and 304B overlaps with the electrodes 321A, 321B, 324A, and 324B are brought into a light-transmitting state.

In the display state in FIG. 11, the regions where each of the electrodes 301A to 301C, 302A to 302C, 303A to 303C, 304A, and 304B overlaps with the electrodes 322A and 322B are brought into a light-blocking state, whereby the pixels 100 which perform display for a left eye are prevented from being seen by a right eye of a user; the regions where each of the electrodes 301A to 301C, 302A to 302C, 303A to 303C, 304A, and 304B overlaps with the electrodes 323A and 323B are brought into a light-blocking state, whereby the pixels 100 which perform display for the right eye are prevented from being seen by the left eye of the user. Further, similarly to the above, the occurrence of crosstalk can be suppressed.

The display device in this embodiment can perform 3D display even when the relative positional relation between the display device and a user is changed. Thus, the display device in this embodiment is highly convenient.

The display device in this embodiment can also perform 2D display as illustrated in FIG. 4. Specifically, display for both eyes is performed in all of the plurality of pixels 100, and a light-transmitting signal is input to all of the electrodes 301A to 301C, 302A to 302C, 303A to 303C, 304A and 304B, 321A and 321B, 322A and 322B, 323A and 323B, and 324A and 324B.

Example

Examples of electronic devices each of which can include a display device according to one embodiment of the present invention are a mobile phone, a portable game console, a portable information terminal, an electronic book reader, a video camera, a digital still camera, and the like. Specific examples of such electronic devices will be described with reference to FIGS. 12A and 12B.

Figure 12A:
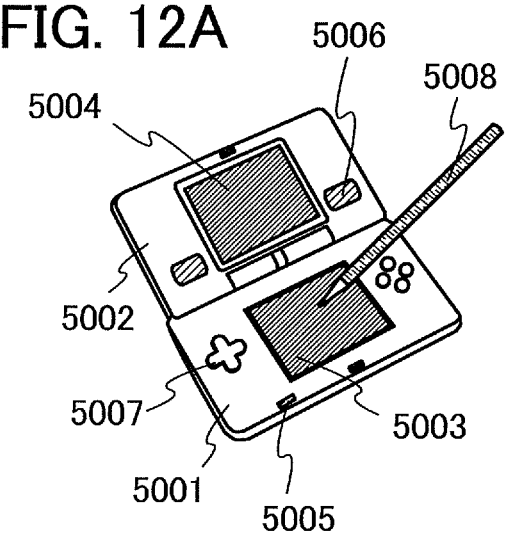
FIGS. 12A and 12B each illustrate a specific example of an electronic device.

FIG. 12A illustrates a portable game console including a housing 5001, a housing 5002, a display portion 5003, a display portion 5004, a microphone 5005, speakers 5006, operation keys 5007, a stylus 5008, and the like. The display device according to one embodiment of the present invention can be used as the display portion 5003 or the display portion 5004. By using the display device according to one embodiment of the present invention as the display portion 5003 or the display portion 5004, it is possible to provide a highly convenient portable game console capable of displaying 3D images. Although the portable game console in FIG. 12A has the two display portions 5003 and 5004, the number of display portions included in a portable game console is not limited to this.

Figure 12B:
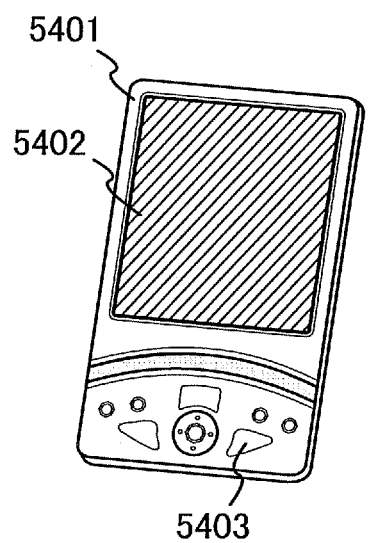

FIG. 12B illustrates a portable information terminal including a housing 5401, a display portion 5402, and operation keys 5403. The display device according to one embodiment of the present invention can be used as the display portion 5402. By using the display device according to one embodiment of the present invention as the display portion 5402, it is possible to provide a highly convenient portable information terminal capable of displaying 3D images.

This application is based on Japanese Patent Application serial No. 2011-151512 filed with the Japan Patent Office on Jul. 8, 2011, the entire contents of which are hereby incorporated by reference.

What is claimed is:
1. A display device comprising:
   a display panel comprising:
      a plurality of pixels comprising a first pixel, a second pixel, and a third pixel; and
   a shutter panel over the display panel comprising:

a first electrode;
a second electrode; and
a third electrode;
a fourth electrode;
a fifth electrode; and
a sixth electrode,
wherein the first pixel, the second pixel, and the third pixel are aligned in a first direction in this order,
wherein the first electrode, the second electrode, and the third electrode are provided in parallel or substantially parallel to one another and in this order,
wherein the fourth electrode, the fifth electrode, and the sixth electrode are provided in parallel or substantially parallel to one another and in this order,
wherein the first electrode, the second electrode, and the third electrode are perpendicular or substantially perpendicular to the fourth electrode, the fifth electrode, and the sixth electrode,
wherein the first pixel and the third pixel perform desired color display and the second pixel performs black display in a first display state,
wherein a light-transmitting signal is input to the third electrode and a light-blocking signal is input to the first electrode and the second electrode in the first display state,
wherein the second pixel performs desired color display and the first pixel and the third pixel perform black display in a second display state, and
wherein a light-transmitting signal is input to the first electrode and a light-blocking signal is input to the second electrode and the third electrode in the second display state.

2. The display device according to claim 1,
wherein the first electrode is overlapping with the first pixel and the second pixel,
wherein the second electrode is overlapping with the second pixel and the third pixel, and
wherein the third electrode is overlapping with the third pixel.

3. The display device according to claim 1,
wherein all of the plurality of pixels perform desired color display in a fifth display state, and
wherein a light-transmitting signal is input to the first electrode, the second electrode, the third electrode, the fourth electrode, the fifth electrode, and the sixth electrode.

4. The display device according to claim 1, wherein the plurality of pixels performs display by utilizing organic electroluminescence.

5. The display device according to claim 1, wherein the second pixel is provided next to the first pixel and the third pixel is provided next to the second pixel.

6. The display device according to claim 1,
wherein the second electrode is provided next to the first electrode, and the third electrode is provided next to the second electrode, and
wherein the fifth electrode is provided next to the fourth electrode, and the sixth electrode is provided next to the fifth electrode.

7. A display device comprising:
a display panel comprising:
  a plurality of pixels comprising a first pixel, a second pixel, a third pixel, and a fourth pixel; and
a shutter panel over the display panel comprising:
  a first electrode;
  a second electrode; and
  a third electrode;
a fourth electrode;
a fifth electrode;
a sixth electrode;
a seventh electrode;
an eighth electrode;
wherein the first pixel, the second pixel, the third pixel, the fourth pixel are aligned in a first direction in this order,
wherein the first electrode, the second electrode, the third electrode, the fourth electrode are provided in parallel or substantially parallel to one another,
wherein the fifth electrode, the sixth electrode, the seventh electrode, and the eighth electrode are provided in parallel or substantially parallel to one another and in this order,
wherein the first electrode, the second electrode, the third electrode, and the fourth electrode are perpendicular or substantially perpendicular to the fifth electrode, the sixth electrode, the seventh electrode, and the eighth electrode and in this order,
wherein the first pixel and the third pixel perform desired color display and the second pixel and the fourth pixel perform black display in a first display state,
wherein a light-transmitting signal is input to the third electrode and the fourth electrode and a light-blocking signal is input to the first electrode and the second electrode in the first display state,
wherein the second pixel and the fourth pixel perform desired color display and the first pixel and the third pixel perform black display in a second display state, and
wherein a light-transmitting signal is input to the first electrode and the fourth electrode and a light-blocking signal is input to the second electrode and the third electrode in the second display state.

8. The display device according to claim 7,
wherein the first electrode is overlapping with the first pixel and the second pixel,
wherein the second electrode is overlapping with the second pixel and the third pixel,
wherein the third electrode is overlapping with the third pixel and the fourth pixel, and
wherein the fourth electrode is overlapping with the fourth pixel.

9. The display device according to claim 7,
wherein all of the plurality of pixels perform desired color display in a fifth display state, and
wherein a light-transmitting signal is input to the first electrode, the second electrode, the third electrode, the fourth electrode, the fifth electrode, the sixth electrode, the seventh electrode, and the eighth electrode.

10. The display device according to claim 7, wherein the plurality of pixels performs display by utilizing organic electroluminescence.

11. The display device according to claim 7, wherein the second pixel is provided next to the first pixel, the third pixel is provided next to the second pixel, and the fourth pixel is provided next to the third pixel.

12. The display device according to claim 7,
wherein the second electrode is provided next to the first electrode, the third electrode is provided next to the second electrode, and the fourth electrode is provided next to the third electrode, and
wherein the sixth electrode is provided next to the fifth electrode, the seventh electrode is provided next to the sixth electrode, and the eighth electrode is provided next to the seventh electrode.

* * * * *